(No Model.)
H. R. MASON.
QUICK RELEASE VALVE FOR AIR BRAKES.
No. 467,111. Patented Jan. 12, 1892.
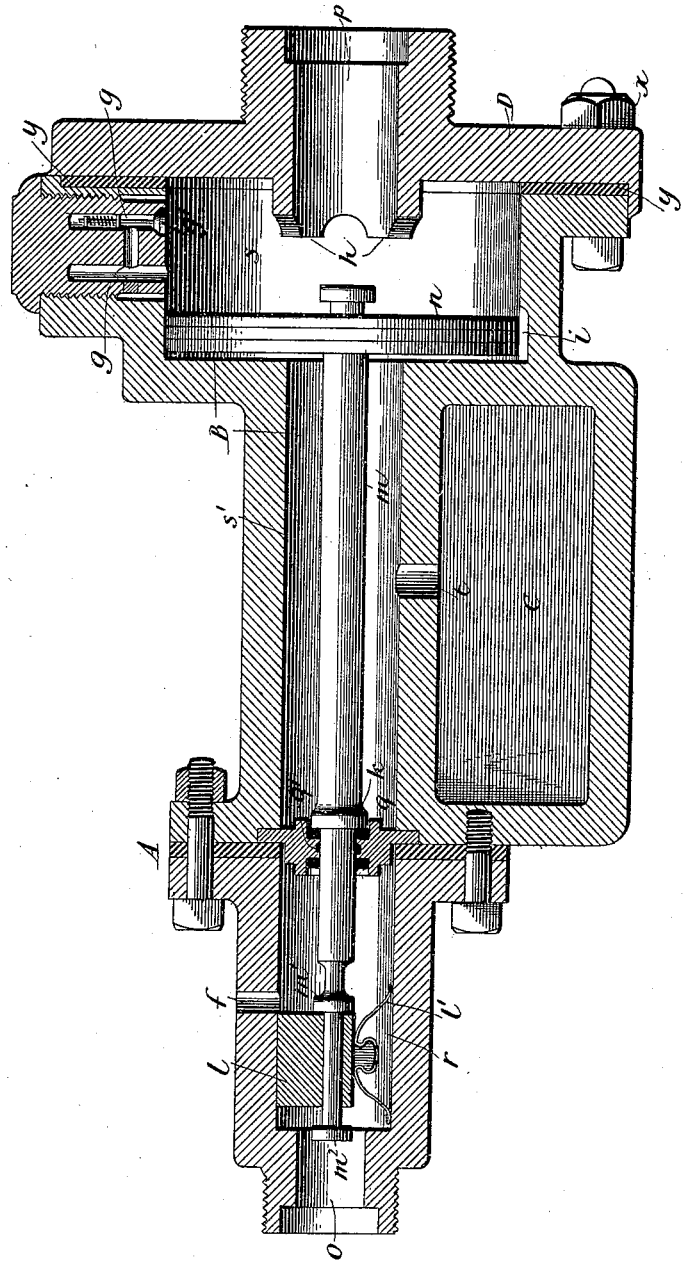
WITNESSES
INVENTOR
Harry R. Mason
By Dyrenforth & Dyrenforth,
his Attorneys.

UNITED STATES PATENT OFFICE.

HARRY R. MASON, OF CHICAGO, ILLINOIS.

QUICK-RELEASE VALVE FOR AIR-BRAKES.

SPECIFICATION forming part of Letters Patent No. 467,111, dated January 12, 1892.

Application filed December 18, 1891. Serial No. 415,462. (No model.)

*To all whom it may concern:*

Be it known that I, HARRY R. MASON, a citizen of the United States, residing at Chicago, in the county of Cook and State of Illinois, have invented a new and useful Improved Quick-Release Valve for Air-Brakes, of which the following is a specification.

My invention relates to a valve device of improved construction to form a part of or attachment to valve devices hitherto employed in air-brake systems.

The device is in the nature of an improvement upon a certain quick-release valve for air-brakes forming the subject of an application for Letters Patent of the United States filed by me August 22, 1891, and bearing Serial No. 403,440.

My object is to provide certain changes in the construction shown and specifically described in my said pending application, to the end of adapting the device more perfectly to its purpose.

Broadly stated, the present device, like the device described in my aforesaid application, is intended to operate, by the initial rise of pressure in the train-pipe after brakes have been applied, to vent pressure from the brake-cylinder to release brakes and be independent in its action of the triple-valve mechanism, which controls communication between the train-pipe, auxiliary reservoir, and brake-cylinder, and also between the latter and the outside air.

The drawing illustrates a longitudinal section of my improved device.

The other features of the brake mechanism to which it is attached, and to which reference will hereinafter be made, being of such well-known construction as to require no illustration in the present connection.

A is a shell or casing formed in two parts, as shown, having a piston-chamber B, an auxiliary expansion-chamber C, communicating with the chamber B through a passage $t$ and a chamber or passage $r$. The chamber B is formed with an enlarged portion $s$ and a reduced portion $s'$. Fitting upon the end of the shell A, containing the enlarged portion $s$ of the chamber B, is a cap D, secured in position by means of nut-bolts $x$ or in any other suitable manner. Between the cap D and shell A a gasket $y$ is interposed to prevent leakage. Through the cap D is an opening $p$, at which the chambers B and C communicate with the main train or brake pipe of the brake system. The opposite end of the shell is provided with an opening $o$, which extends from the chamber $r$ and communicates with the brake-cylinder of the brake system. The pipe (not shown) which extends between the shell A and brake-cylinder enters the end of the latter, which communicates with the triple-valve mechanism. In the enlarged portion $s$ of the chamber B is a piston $n$, which at its circumference fits closely and slides against the inner wall of the chamber. The piston $n$ is upon the end of a stem $m$, extending centrally along the reduced portion of the chamber B, through a diaphragm $q$. The diaphragm $q$ separates the chambers $s'$ and $r$, and its opening, through which the stem $m$ reciprocates, may be provided with a suitable bushing $q'$ to guard against leakage. Through the wall of the chamber $r$ is an outlet-opening $f$. At the end of the stem $m$, opposite the valve $n$, is a slide-valve $l$, placed between stops $m'$ $m^2$ on the stem, which engage and slide the valve $l$, the distance between stops being somewhat in excess of the length of that valve to permit to the stem limited independent play. The valve $l$ opens and closes the outlet $f$, and is held to its seat against the wall of its chamber $r$ by a sliding spring $l'$. A stop $k'$ on the stem $m$ in the forward movement of the latter strikes the diaphragm $q$ and prevents seating of the valve $n$ against the wall of the chamber $s$, about the mouth of the chamber $s'$. In the side wall of the chamber $s$ is a groove or passage $i$, which, when the valve $n$ is in the forward position shown, affords communication between the chambers $s$ and $s'$. The backward movement of the valve $n$ is limited by stops $h$, extending inward from the cap D. In the side wall of the chamber $s$ is an equalizing-passage $g$, which, when the piston $m$ is forced backward, as hereinafter described, against the stops $h$, affords a passage between opposite sides of the valve $n$. In the passage $g$ is a check or non-return valve $g'$, which permits pressure to pass around the valve $n$ in the direction of the opening $p$ and train-pipe, but prevents the passage of pressure in the opposite direction.

In operation, when the train-pipe is filled with air from the main reservoir on the locomotive, pressure passes from the train-pipe through the opening $p$ into the chamber $s$, and moves the valve $n$ to the position shown in the figure and opens the passage $i$, through which pressure enters and fills the expansion-chamber $s'$ and auxiliary expansion-chamber C. Thus the chambers C and $s'$ are filled with the same pressure approximately as that of the train-pipe, and the pressures against opposite sides of the valve $n$ are rendered equal. The movement of the valve $n$ described and consequent movement of the stem $m$ forces the valve $l$ to the position shown, wherein it opens the passage from the brake-cylinder through $o$ $r$ $f$ to the outside air. The brake-cylinder is thus permitted to exhaust itself of pressure. The valves upon the stem $m$ move with but slight frictional resistance, so that when pressure is vented from the train-pipe to apply brakes the expansion of the air in the expansion-chamber $s'$ and auxiliary expansion-chamber C will force the valve $n$ backward to the stops $h$. In the backward movement of the valve $n$ it draws with it the valve $l$ to cover the outlet $f$, and thus closes the passage from the brake-cylinder to the outside air. Any further reduction in the train-pipe than that necessary to move the valves will cause the then superior pressure in the chambers $s'$ C to retrogress to the train-pipe through the passage $g$ by opening the check-valve $g'$. Thus the pressures on opposite sides of the valve $n$ will become substantially equalized. When pressure is raised in the train-pipe to release brakes, the initial rise of the pressure exerts itself against the valve $n$ and forces it to the position shown in the figure. The non-return or check valve $g'$ in the passage $g$ forms no material obstruction to the passage of pressure from the chambers C $s'$ to the train-pipe, but prevents the flow of air in the opposite direction through the passage $g$. Therefore the chambers $s'$ and C can receive no pressure from the train-pipe except through the groove or passage $i$. It will be seen that the valve mechanism described is independent of the triple valve and will operate to release brakes, whether the pressure has been brought up high enough to actuate the triple-valve mechanism or not.

The importance of my improved quick-release mechanism in an air-brake system will be apparent when it is understood that in a train of cars scarcely two triple-valve mechanisms will operate to release brakes at the same time. The reasons for this are obvious. It a well-known fact that in a train of cars when brakes are applied the brake-cylinder pistons travel unequal distances and the reductions of pressure in the auxiliary reservoirs will in consequence vary materially. Consequently the rise of pressure in the train-pipe to release brakes will have to be greater to actuate one triple valve than another. It will be seen, therefore, that while after a service-stop it may require a rise of ten pounds to release the brakes on one car it may require a rise of fifteen or more pounds on another car to release the brakes. With my improved quick-release valves an increase of pressure in the train-pipe of but a few pounds against any said valve in the train will actuate it and release the brakes.

While the construction shown and described in this application will operate satisfactorily, it is obvious that it may be changed in the matter of details without departing from the spirit of my invention as defined by the claims. The valve $n$ is shown to be a traveling piston, but it will be readily apparent that other well-known forms of valves which will operate in the same general way and accomplish my object may be substituted for the construction shown.

What I claim as new, and desire to secure by Letters Patent, is—

1. In combination with the train-pipe and brake-cylinder of a brake system, a quick-release-valve device independent of the triple valve, comprising a shell provided with an expansion-chamber communicating with the train-pipe only, an exhaust-passage from the brake-cylinder to the outside air, a valve governing the exhaust through said passage controlled by a valve movable by differential pressure and interposed between the train-pipe and expansion-chamber, an equalizing-passage for pressure from the expansion-chamber to the train-pipe opened by movement of the interposed valve when the train-pipe pressure is reduced for a service or an emergency stop, a non-return valve in said equalizing-passage, and a passage for pressure from the train-pipe to the expansion-chamber opened by said interposed valve when the train-pipe pressure is raised, substantially as and for the purpose set forth.

2. In combination with the train-pipe and brake-cylinder of a brake system, a quick-release-valve device independent of the triple valve, comprising a shell provided with an expansion-chamber communicating with the train-pipe only, an exhaust-chamber communicating with the brake-cylinder, an outlet from the exhaust-chamber to the outside air, a slide-valve in the exhaust-chamber governing said outlet and controlled by a valve movable by differential pressure and interposed between the train-pipe and expansion-chamber, an equalizing-passage for pressure from the expansion-chamber to the train-pipe opened by movement of the interposed valve when the train-pipe pressure is reduced for a service or an emergency stop, a non-return valve in said equalizing-passage, and a passage for pressure from the train-pipe to the expansion-chamber opened by said interposed valve when the train-pipe pressure is raised, substantially as and for the purpose set forth.

HARRY R. MASON.

Witnesses:
J. W. DYRENFORTH,
M. J. FROST.